(12) United States Patent
Kim (10) Patent No.: US 11,935,132 B2
(45) Date of Patent: Mar. 19, 2024

(54) SMART PENSION MANAGEMENT SYSTEM AND DRIVING METHOD THEREFOR

(71) Applicant: Chang Hoon Kim, Seoul (KR)

(72) Inventor: Chang Hoon Kim, Seoul (KR)

(*) Notice: Subject to any disclaimer, the term of this patent is extended or adjusted under 35 U.S.C. 154(b) by 0 days.

(21) Appl. No.: 17/763,651

(22) PCT Filed: May 13, 2020

(86) PCT No.: PCT/KR2020/006282
§ 371 (c)(1),
(2) Date: Mar. 25, 2022

(87) PCT Pub. No.: WO2021/091036
PCT Pub. Date: May 14, 2021

(65) Prior Publication Data
US 2022/0335533 A1 Oct. 20, 2022

(30) Foreign Application Priority Data
Nov. 6, 2019 (KR) .................. 10-2019-0140898

(51) Int. Cl.
*G06Q 40/08* (2012.01)
(52) U.S. Cl.
CPC .................. *G06Q 40/08* (2013.01)
(58) Field of Classification Search
CPC .................................................. G06Q 40/08
USPC ........................................................ 705/4
See application file for complete search history.

(56) References Cited

U.S. PATENT DOCUMENTS

| 7,917,415 | B1 | 3/2011 | Petruzzl | |
|---|---|---|---|---|
| 2004/0249660 | A1 | 12/2004 | Williams et al. | |
| 2008/0288383 | A1* | 11/2008 | Bernard | G06Q 40/00 705/35 |
| 2010/0299160 | A1* | 11/2010 | Roscoe | G06Q 40/06 705/37 |

(Continued)

FOREIGN PATENT DOCUMENTS

| JP | 2001-325444 A | 11/2001 |
|---|---|---|
| JP | 2002-342576 A | 11/2002 |

(Continued)

OTHER PUBLICATIONS

English Specification of 10-2014-0025850.
(Continued)

*Primary Examiner* — Robert R Niquette
(74) *Attorney, Agent, or Firm* — ANTONIO HA & U.S. PATENT, LLC (57) ABSTRACT

The present invention relates to a smart pension management system and a driving method therefor. The smart pension management system comprises: a number-of-accounts calculation unit for calculating the number of pension accounts by using user age information, life expectancy information, and pension indexes; a payment amount determination unit for determining a monthly pension payment by using the number of pension accounts calculated by the number-of-accounts calculation unit; and a payment processing unit for paying, to a user's account, the monthly pension payment determined by the payment amount determination unit, and thus a client can transparently and easily check pension payment details and management situation.

2 Claims, 2 Drawing Sheets

(56) References Cited

U.S. PATENT DOCUMENTS

| | | | | |
|---|---|---|---|---|
| 2012/0284082 A1* | 11/2012 | Newman | ............... | G06Q 40/08 |
| | | | | 705/7.29 |
| 2012/0330688 A1* | 12/2012 | Goldsmith | ............ | G06Q 40/08 |
| | | | | 705/322 |
| 2014/0108296 A1* | 4/2014 | O'Hara | ................. | G06Q 40/08 |
| | | | | 705/36 R |

FOREIGN PATENT DOCUMENTS

| JP | 2003-233698 A | 8/2003 |
|---|---|---|
| JP | 2006-235888 A | 9/2006 |
| KR | 10-2007-0045785 | 5/2007 |
| KR | 10-2014-0025850 | 3/2014 |
| KR | 10-2015-0141063 | 12/2015 |
| KR | 10-2019-0123390 | 11/2019 |
| KR | 10-2105553 | 4/2020 |

OTHER PUBLICATIONS

English Specification of JP2001-325444A.
English Specification of 10-2015-0141063.
English Specification of JP2003-233698A.
English Specification of JP2002-342576A.
English Specification of 10-2007-0045785.
English Specification of 10-2019-0123390.
English Specification of JP2006-235888A.
English Specification of 10-2105553.
Albrecht et al., "Self-annuitization, consumption shortfall in retirement and asset allocation: the annuity benchmark", Journal of Pension Economics & Finance 1.3, pp. 269-288, 2002.

* cited by examiner

SMART PENSION MANAGEMENT SYSTEM AND DRIVING METHOD THEREFOR

TECHNICAL FIELD

The present invention relates to a smart pension management system and a driving method thereof, and more particularly, to a smart pension management system for determining a monthly pension payment amount based on a pension index set by itself, and a driving method thereof.

BACKGROUND ART

Pensions are divided into a fixed type, in which the receiving period is fixed to a certain period, and a life type, in which payment lasts until death.

Because the calculation process is simple and easy, the fixed type is widely used by banks (pension trusts), asset management companies (pension funds), and non-life insurance companies (pension insurance).

The life type is used by the state-managed national pension and life insurance companies (pension insurance) due to the tricky and complicated calculation process.

From the customer's point of view, the life type is preferred to the fixed type. However, it is necessary to introduce a technology that enables payment for a pension through a transparent procedure by establishing a clear definition for the life type, which has tricky and opaque calculation, between the pension company and the customer.

DETAILED DESCRIPTION OF THE INVENTION

Technical Problems

The present invention has been conceived in the technical background, and an object of the present invention is to provide a smart pension management system and a driving method thereof that is able to check pension payment details and management status in a transparent manner.

Also provided is a smart pension management system and driving method thereof, which may establish a clear pension management definition between the pension management company and the customer to clearly and simply define a process for calculating pension payment amounts.

MEANS TO ADDRESS THE PROBLEMS

To achieve the above objectives, the present invention includes the following components.

In other words, according to an embodiment of the present invention, a smart pension management system comprises a number-of-accounts calculating unit calculating a number of pension accounts based on user age information, average life expectancy information, and a pension index, a payment amount determining unit determining a monthly pension payment using the number of pension accounts calculated by the number-of-accounts calculating unit, and a payment processing unit paying the monthly pension payment determined by the payment amount determining unit to a users account.

Meanwhile, a method for driving a smart pension management system comprises calculating a number of pension accounts based on user age information, average life expectancy information, and a pension index, by a number-of-accounts calculating unit, determining a monthly pension payment using the number of pension accounts calculated by the number-of-accounts calculating unit, by a payment amount determining unit, and paying the monthly pension payment determined by the payment amount determining unit to a user's account, by a payment processing unit.

Effects of the Invention

According to the present invention, it is possible to provide a smart pension management system and a driving method thereof that enable the customer to transparently and easily check pension payment details and management status.

Further, it is possible to provide a smart pension management system and a driving method thereof that may accurately grasp the asset management status of the pension for which payments have been made to date in real time through a simple search process.

The pension company may accurately and simply calculate and pay pension payments by applying the pension index to each customer without performing a complicated calculation process for expected payments through predicting individual uncertain future situations. In other words, it is possible to increase the accuracy of calculating the pension payments and secure the transparency of the pension management process.

It is also possible to provide a convenient user interface and save operating costs by operating an overall pension management process or providing information on the Internet or using an application.

BEST MODE TO PRACTICE THE INVENTION

The terms as used herein are provided merely to describe some embodiments thereof, but not to limit the present disclosure. The terms as used herein are provided merely to describe some embodiments thereof, but not to limit the scope of other embodiments of the present disclosure. Unless otherwise defined, all terms including technical and scientific terms used herein have the same meaning as commonly understood by one of ordinary skill in the art to which the embodiments of the present invention pertain and should not be interpreted as overly broad or narrow.

Hereinafter, preferred embodiments of the present invention are described in detail with reference to the accompanying drawings.

Figure 1:
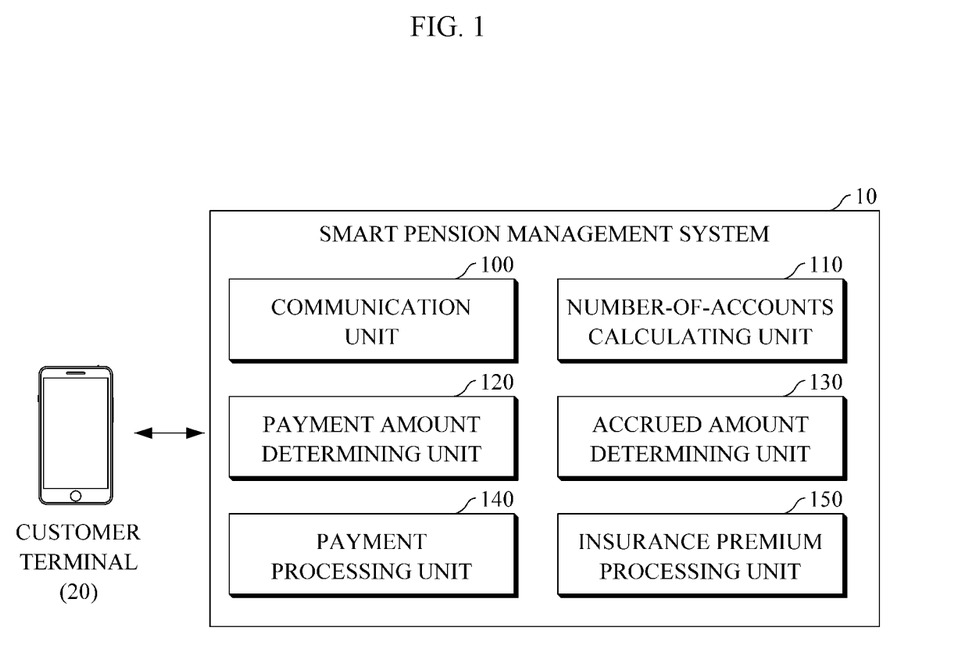
FIG. 1 is a block diagram illustrating a configuration of a smart pension management system according to an embodiment of the present invention.

FIG. 1 is a block diagram illustrating a configuration of a smart pension management system according to an embodiment of the present invention.

A customer terminal 20 is an IP-assigned terminal and performs network communication through the Internet or the like. The customer terminal 20 may be, e.g., a portable mobile wireless communication device examples of which may include navigation devices, a Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smartphone, a smartpad, tablet PC, or any other various types of handheld wireless communication devices.

Further, the customer terminal 20 may be a desktop PC, a slate PC, a laptop computer, or a PMP (Portable Multimedia Player). Of course, the terminal to which the present invention is applicable is not limited to the above described ones but may rather include all terminals which may communicate with external devices.

In an embodiment, the smart pension management system 10 includes a service platform that drives an application that provides a user interface for checking pension management and related information.

The smart pension management system 10 according to an embodiment includes a communication unit 100, a number-of-accounts calculating unit 100, a payment amount determining unit 120, a payment processing unit 140, an accrued amount determining unit 130, and an insurance premium processing unit 150.

The communication unit 100 may include both a communication module for supporting wired communication and a mobile communication module for supporting wireless communication. The mobile communication module transmits or receives wireless signals to/from at least one of a base station and an external terminal over a mobile communication network established as per mobile communication standards, protocols, or schemes, such as global system for mobile communication (GSM), code division multiple access (CDMA), CDMA2000, enhanced voice-data optimized or enhanced voice-data only (EV-EVDO), wideband CDMA (WCDMA), high speed downlink packet access (HSDPA), high speed uplink packet access (HSUPA), long term evolution (LTE), or LTE-advanced (LTE-A).

In an embodiment, the communication unit 100 performs data communication with the customer terminal 20, where a smart pension dedicated application is installed and executed, or which accesses a smart pension dedicated website. Further, the communication unit 100 communicates with an external agency server and an information provider server to gather information regarding average life expectancy required for determining the amount of pension payment. Further, the communication unit 100 may communicate with a financial institution server for pension payment processing.

The number-of-accounts calculating unit 100 calculates the number of pension accounts based on age information, average life expectancy information, and pension index of the user, that is, the customer.

In an embodiment, the pension index used in the smart pension management system 10 is a value determined every day, and the financial transaction service provided by the smart pension management system 10 according to an embodiment is performed based on the pension index.

In the smart pension management system 10 according to an embodiment, asset management consists of three types: a bond investment-oriented type, a stock investment-oriented type, and a bond and stock mixed type. Accordingly, three pension indexes are created.

In the bond investment-oriented type, the stock investment-oriented type, and the bond and stock mixed type, the pension index may all increase or decrease.

Hereinafter, with reference to Table 1, an exemplary situation of creating a pension index in the bond investment-oriented type is described,

TABLE 1

| time | pension index | | Pension index increase rate compared to the previous day |
|---|---|---|---|
| Nov. 12, 2012 | 44,450 won | | |
| Nov. 13, 2012 | 44,454 won | +4 won | 3.62% |
| Nov. 14, 2012 | 44,458 won | +4 won | 3.65% |
| Nov. 15, 2012 | 44,462 won | +4 won | 3.69% |
| Nov. 16, 2012 | 44,466 won | +4 won | 3.72% |
| Nov. 17, 2012 | 44,470 won | +4 won | 3.76% |
| Nov. 18, 2012 | 44,475 won | +5 won | 3.80% |
| Nov. 19, 2012 | 44,480 won | +5 won | 3.91% |
| Nov. 20, 2012 | 44,485 won | +5 won | 3.92% |
| Nov. 21, 2012 | 44,490 won | +5 won | 3.90% |
| Nov. 22, 2012 | 44,495 won | +5 won | 3.82% |
| Nov. 23, 2012 | 44,500 won | +5 won | 3.81% |
| ... | ... | ... | ... |
| Dec. 11, 2012 | 44,592 won | +5 won | 4.45% |
| Dec. 12, 2012 | 44,597 won | +5 won | 4.38% |
| Dec. 13, 2012 | 44,602 won | +5 won | 4.31% |
| ... | ... | ... | ... |

Here, the pension index increase rate indicates what percentage (%) the pension index increases per year. As such, the pension index continues to change and increases. If the smart pension management system according to an embodiment first sets a pension index increase rate, the pension index of the next day is calculated according to the index increase rate. In the smart pension management system 10 according to an embodiment, if a customer purchases a lifetime guaranteed pension product, the monthly pension payment amount may be defined as aX. Here, a is a calculated and determined constant, and X is the pension index.

The lifetime guaranteed pension product is a financial service in the form of lifetime pension payment.

Here; a is the number of pension accounts. The number of pension accounts is a value determined when the customer uses the lifetime guaranteed pension product. The number (a) of pension accounts may be calculated as follows.

$$\text{number}(a) \text{ of pension accounts}=(1-\text{profit margin on sales})\times\text{deposit amount}\div\text{number of viable months}\div\text{pension index} \quad \text{[Formula 1]}$$

In Formula 1, the variable "(1−profit margin on sales)×deposit amount" represents the result of deducting, from the deposit amount, a certain percentage as an operating expense of the company operating the smart pension management system. For example; if the company's sales profit rate is set to 7%, this means that the customer may get 93% of the deposit back, as "(1−0.07)×deposit amount".

"÷number of viable months" is a variable used to determine how many months amortization will be made under the assumption that the customer will receive pension during the average lifespan. In this case, the number of viable months is the number of months remaining from the current age of the customer to the end of the average lifespan. The average lifespan is arbitrarily determined based on various statistical data in the smart pension management system 10 and is a changeable value. The average lifespan may be determined to differ depending on the customer's gender, area of residence, or chronic disease.

The smart pension management system according to an embodiment assumes that the lifespans of people are normally distributed around the average lifespan.

In other words, some people die at a younger age than the average life expectancy and others die at a higher age than the average life expectancy. Thus, it is assumed that a half of people die before the average life expectancy and the other half die after the average life expectancy.

In an embodiment, the end of the period during which the customer purchasing a lifetime guaranteed pension product is paid monthly for pension is the time of death of the customer. The smart pension management system may generally grasp the time of death of the customer, when neither profit nor loss is made, according to the average life expectancy.

"÷pension Index" is used to calculate how many times the amount calculated so far corresponds to as compared with the pension index on the day of singing up the lifetime guaranteed pension. In this case, it is preferable that the result value is accurately calculated up to at least 8 digits after the decimal point.

The payment amount determining unit 120 determines the monthly pension payment amount based on the number of pension accounts calculated by the number-of-accounts calculating unit 100.

If the number (a) of pension accounts is determined by the number-of-accounts calculating unit 100, the customer receives aX won as the amount obtained by multiplying the number (a) of pension accounts by the pension index X on the day of receiving the lifetime guaranteed pension, monthly in the future.

The lifetime guaranteed pension is a kind of pension product in which the money deposited by the customer is managed by the smart pension management system 10, and the customer is repaid in monthly installments over the life of the customer.

The amortization amount is proportional to the pension index and therefore increases over time. The end of the amortization is the time of the customer's death.

The payment processing unit 140 pays the monthly pension payment amount determined by the payment amount determining unit 120 to the user's account.

Hereinafter, the principle of amortization in a lifetime guaranteed pension is described in more detail.

When a customer signs up for a lifetime guaranteed pension with a certain amount, the smart pension management system 10 calculates the number of remaining viable months to the average lifespan of the customer. Then, the amount purchased by the customer is divided by the number of months and paid in installments.

For example, if the number of remaining surviving months to the average lifespan of customer a is 400 months, the smart pension management system pays the customer 1/400 of the deposit monthly.

In this case, since interest is applied, customer a receives 1/400 of the deposit plus the interest on the elapsed period. In other words, after one month, customer a receives 1/400 of the deposit plus the interest on one month, after 2 months, customer a receives 1/400 of the deposit plus the interest on two months. In this way, after 400 months, customer a receives 1/400 of the deposit plus the interest on 400 months.

EMBODIMENTS

Customer b is a 65-year-old healthy Korean male. On Nov. 12, 2012, customer b withdraws 200 million won from his installment savings account. Then, with a half of the fund, he signs up for a lifetime guaranteed pension in his name and, with the other half, for a bond-oriented lifetime guaranteed pension in the name of his wife, through the smart pension management system. On the day of sign-up, "Today's pension index: 44,450 won".

Customer b may check a guide including information that is the basis of pension calculation provided by the smart pension management system 10 according to an embodiment. In this case, the guide may be provided through a smart pension dedicated application according to an embodiment or may be provided in the form of a web page that may be viewed by accessing a website opened for smart pension management.

In this case, the guide includes information indicating that customer b is 65 years old and thus corresponds to 9.68628921X and that his wife is 61 years old and thus corresponds to 6.83738062X, The guide contains the content which is a basis for calculation of the pension account (a).

Specifically, the content which is a basis for calculation of the pension account (a) is: "Customer b (65 years old male): 0.93×100,000,000 won÷216 months÷44,450 won=9.68628921", and "wife (61 years old female): 0.93× 100,000,000÷306 months 44,450 won=6.83738062".

Since X is the pension index, customer b receives the amount obtained by multiplying the number of accounts, 9.68628921, obtained each month by the pension index X, and his 61-year-old wife receives the amount obtained by multiplying the number of accounts, 6.83738062, obtained each month by the pension index X.

After checking the guide, customer b may sign up for a lifetime guaranteed pension product through a predetermined approval process including entry of account information.

On Dec. 12, 2012, after one month has elapsed, if the pension index is 44,597 won, 431,919 won is deposited into customer b's account, and 304,927 won is deposited into the account in the name of his wife.

Specifically, the deposit into customer b's account is calculated by the formula: 9.68628921 (number of customer b's accounts)×44,597, and the deposit into the wife's account is calculated by the formula: 6.83738062 (number of wife's accounts)×44,597.

In this case, the pension receipt date may be freely changed by customer b. Then, the smart pension management system pays the pension amount calculated by the number of days.

In one aspect of the present invention, the smart pension management system 10 further provides a lifetime guaranteed pension insurance option.

If the insurance option is selected by the customer, the insurance premium processing unit 150 deducts a predetermined premium from the monthly pension payment determined by the payment amount determining unit 120 and accrues. If the customer dies earlier than the end of life set at the time of insurance signup.

This is an option in case the customer dies earlier than average life expectancy. In this case, the customer who signs up for a lifetime guaranteed pension pays a certain percentage of the received monthly pension payment as an insurance premium until the contracted end of life is reached. If the customer dies earlier than the contracted end of life, the customer receives the insurance money. Preferably, the predetermined insurance premium and the contracted end of life may be set by the customer's judgment. In this case, the predetermined insurance premium may be increased or decreased according to the contracted end of life.

The amount of insurance money may be calculated by deeming the customer (the insured) as alive until the contracted end of life, and it may be set to pay the entire amount in a lump sum or to be paid to a beneficiary designated as an heir in the form of a lifetime guaranteed pension.

Preferably, it is requested to attach a certificate, such as a medical certificate in the case where the lifetime guaranteed pension insurance option is added after the initial signup date.

Further, the smart pension management system 10 further provides a pension index investment deposit option.

In the smart pension management system 10, when a deposit option is selected by the customer, the number-of-accounts calculating unit 110 calculates the number (a') of deposit accounts by the following Formula 2.

number($a'$) of deposit accounts=(1−profit margin on sales)×deposit amount÷pension index          [Formula 2]

When the customer makes a deposit, the number (a') of deposit accounts is determined by making a deduction from the deposit by a profit rate preset in the smart pension management system 10 and dividing it by the pension index X of the day. Thereafter, when the customer wants to withdraw, an amount (a'X) obtained by multiplying the determined number (a') of deposit accounts by the pension index of the day of withdrawal is paid.

The payment amount determining unit 120 determines the withdrawal amount based on the number (a') of deposit accounts calculated by the number-of-accounts calculating unit 100.

For example, it is hypothesized that the sales profit rate of the company operating the smart pension management system is 7%, and the pension index on Nov. 12, 2012 is 44,450 won, and customer c deposits 10 million won.

In this case, if the number (a') of accounts obtained for customer c (a') is calculated as follows:

(1−0.07)×10,000,000 won÷44,450 won=209.22384702.

In other words, the number (a') of accounts obtained is 209.22384702. Customer c may withdraw an amount (aX) obtained by multiplying the number (a') of accounts obtained by the pension index of the day.

Even in this case, the customer may choose one among the asset management types: bond investment-oriented type, stock investment-oriented type, and bond and stock mixed type.

A method for withdrawing the pension index investment deposit is implemented to make a prior notice, as in a time deposit. Further, it is also possible to change the settings to allow the customer to receive pension money from the money deposited in the pension index investment deposit account when he wants, In a further aspect, the smart pension management system further provides a fixed pension option.

If the fixed pension option is selected, the number-of-accounts calculating unit 100 calculates the number (a'') of fixed payment accounts by Formula 3.

number($a''$) of fixed payment accounts=(1−profit margin on sales)×deposit amount÷pension index÷amortization period(number of months)          [Formula 3]

In this case, the payment amount determining unit 120 determines a fixed monthly payment based on the number (a'') of fixed payment accounts calculated by the number-of-accounts calculating unit 100.

Unlike the life-type pension, the fixed pension option pays a certain amount in installments for the period desired by the customer. In this case as well, the monthly payment to the customer increases as the pension index increases. The installment payment period may be arbitrarily set and changed by the customer.

For example, if customer d deposits 200 million won on Nov. 12, 2012 and agrees to receive payment in installments for 247 months (20 years and 7 months), the number (a'') of fixed payment accounts of customer d is (1-0.07)×200,000,000÷44,450 won÷247 (months)=16.94120219, according to Formula 3.

In other words, customer d will receive 16.94120219X won, which is the amount obtained by multiplying 16.94120219, which is the number (a'') of fixed payment accounts, by the pension index X on the payment date, as a fixed monthly payment, for 247 months.

For example, on Dec. 12, 2012, customer d receives 16.94120219×44,597 won=755,527 won as a fixed monthly payment.

As the pension index increases over time, the expected payment to customer d also increases.

In the case of the pension index fixed-type pension, when selecting the pension index, the customer may choose one among a stock investment-oriented type, a bond investment-oriented type, and a stock and bond mixed type.

Further, since the pension index fixed-type pension is a fixed-type pension product, even when the customer dies early, the remaining amount may be returned to the heir. This has the advantage that customer may freely use a very large portfolio (diversified investment), i.e., pension index.

The smart pension management system 10 further provides a pension index investment installment savings option.

The pension index installment savings option is a financial service that allows a customer to deposit small amounts into a pension index investment deposit account and withdraw a large sum of money later. In this case, the deposit period may be set and changed by the customer arbitrarily. The number of accounts obtained each month is calculated in the same manner as in the case of the pension index investment deposit. However, monthly deposits are applied instead of a one-time deposit.

In other words, when the pension index installment savings option is selected, the number-of-accounts calculating unit 100 calculates the number (a''') of installment savings accounts by Formula 4.

number($a'''$) of installment savings accounts=(1−profit margin on sales)×monthly payment÷pension index          [Formula 4]

The accrued amount determining unit 130 may determine the accrued amount by multiplying the number (a''') of installment savings accounts calculated in Formula 4 by the pension index X.

As an example, if customer e deposits 100,000 won into the pension index installment savings on Nov. 12, 2012, the number (a''') of monthly installment savings accounts is (1−0.07)×100,000 won÷44,450 won=2.09223847.

If customer e deposits 100,000 won into the pension index installment savings one month later, i.e., on Dec. 12, 2012, the number (a''') of monthly installment savings accounts is (1−0.07)×100,000 won÷44,597 won=2.08534206.

In other words, even when the same amount is deposited to the pension index installment savings, the number (a''') of monthly installment savings accounts decreases over time. This is why the pension index X increases.

Therefore, the accrued amount is determined as the amount obtained by the number (Σa''') of accrued accounts, which is calculated as the sum of the numbers (a''') of monthly installment savings accounts, by the pension index X whenever the customer makes a deposit after a period of time. If the payment period elapses or expires, or after that, the customer ay withdraw the accrued money with a deferral period.

In the case of the pension index installment savings, the customer may choose the pension index as desired, as one of the stock investment-oriented type, the bond investment-oriented type, and the stock and bond mixed type.

This has the advantage that customer may freely use a very large portfolio (diversified investment), i.e., pension index.

In an embodiment, the company of operating the smart pension management system (hereinafter, "smart pension company") invests the money deposited by the customer in three types, e.g., bond investment-oriented type, stock investment-oriented type, and bond and stock mixed type. Diversified investment (portfolio investment) is performed for each type of investment.

There are two sources of revenue for the smart pension company. One is the profit margin on sales, and the other is the profit margin on fund management. The profit margin on fund management refers to a rate resultant from deducting the pension index increase rate (the rate of return to the customer) from the actual return-on-investment rate of the bond investment-oriented, stock investment-oriented, or bond and stock-mixed type when the customer makes deposits to, e.g., the lifetime guaranteed pension or pension index investment deposit.

For example, assuming that the actual return-on-investment rate is 3.5% per year and the pension index increase rate is 3.0% per annum, the profit margin on fund management is 0.5% per annum.

As another example, assuming that the actual return-on-investment rate is 9.2% per year and the pension index increase rate is 8.4% per annum, the profit margin on fund management is 0.8% per annum.

As the smart pension company is a pension specialist, it manages the money deposited by the customer for a very long period of time, e.g., over several decades. Therefore, even when it is assumed that the profit margin on fund management is 0.5% per annum, the actual benefits that the pension company will receive may accrue over a period of several decades.

Figure 2:
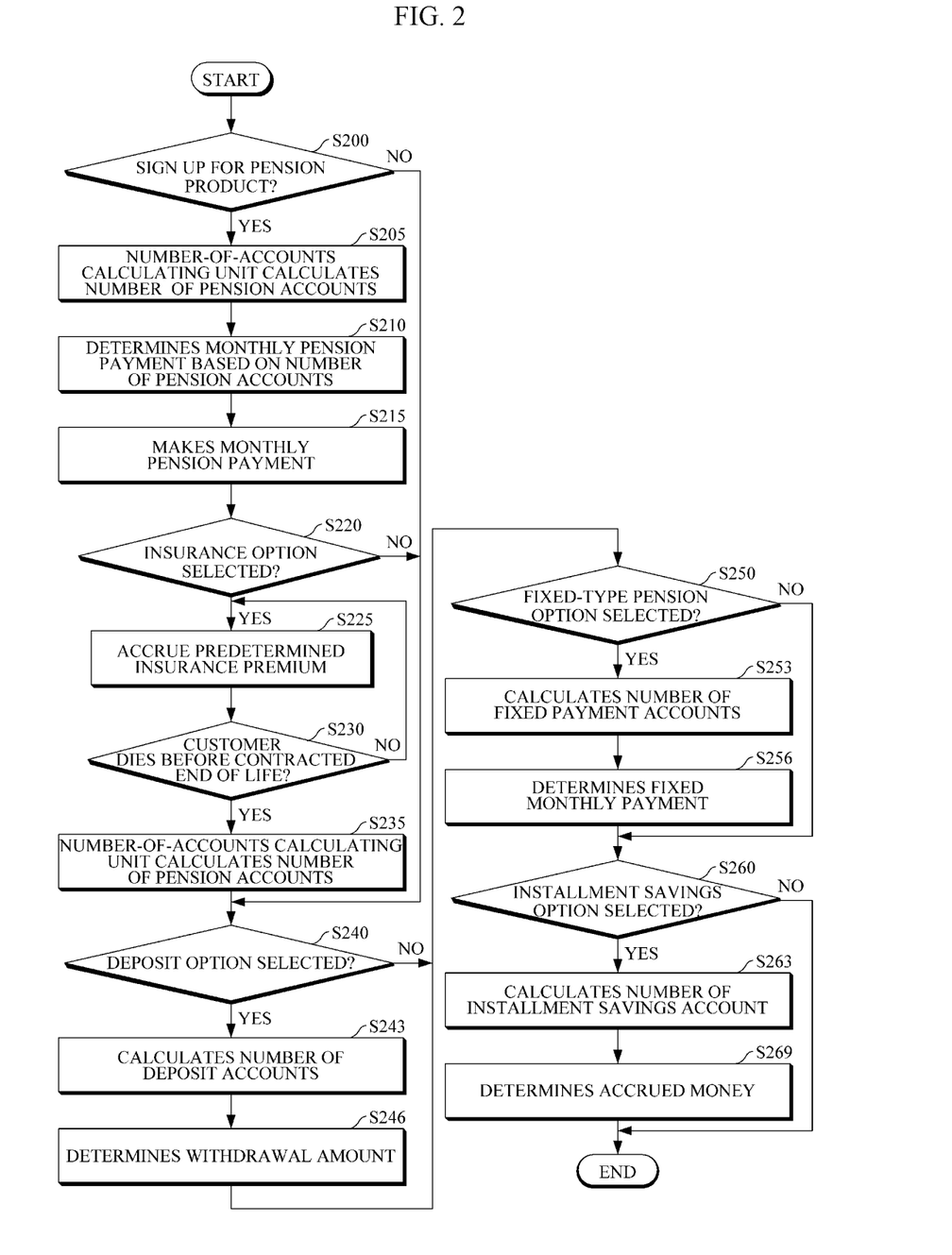
FIG. 2 is a flowchart illustrating a method for driving a smart pension management system according to an embodiment of the present invention.

FIG. 2 is a flowchart illustrating a method for driving a smart pension management system according to an embodiment of the present invention.

In a method for the smart pension management system, if a user (customer) signs up for a pension product (S200), the number-of-accounts calculating unit calculates the number of pension accounts based on the user age information, average life expectancy information, and the pension index (S205), In an aspect, the number of pension accounts is a value determined when the customer uses the lifetime guaranteed pension product. The number (a) of pension accounts may be calculated by Formula 1 as follows.

$$\text{Number}(a) \text{ of pension accounts} = (1 - \text{profit margin on sales}) \times \text{deposit amount number of viable months} \div \text{pension index}$$

In Formula 1, the variable "(1−profit margin on sales)×deposit amount" represents the result of deducting, from the deposit amount, a certain percentage as an operating expense of the company operating the smart pension management system. For example, if the company's sales profit rate is set to 7%, this means that the customer may get 93% of the deposit back, as "(1−0.07)×deposit amount".

"÷number of viable months" is a variable used to determine how many months amortization will be made under the assumption that the customer will receive pension during the average lifespan. In this case, the number of viable months is the number of months remaining from the current age of the customer to the end of the average lifespan. The average lifespan is arbitrarily determined based on various statistical data in the smart pension management system and is a changeable value. The average lifespan may be determined to differ depending on the customer's gender, area of residence, or chronic disease.

The smart pension management system according to an embodiment assumes that the lifespans of people are normally distributed around the average lifespan.

In other words, some people die at a younger age than the average life expectancy and others die at a higher age than the average life expectancy. Thus, it is assumed that a half of people die before the average life expectancy and the other half die after the average life expectancy.

In an embodiment, the end of the period during which the customer purchasing a lifetime guaranteed pension product is paid monthly for pension is the time of death of the customer. The smart pension management system may generally grasp the time of death of the customer, when neither profit nor loss is made, according to the average life expectancy.

"÷pension Index" is used to calculate how many times the amount calculated so far corresponds to as compared with the pension index on the day of singing up the lifetime guaranteed pension. In this case, it is preferable that the result value is accurately calculated up to at least 8 digits after the decimal point.

The payment amount determining unit determines the monthly pension payment based on the calculated number of pension accounts (S210).

The payment amount determining unit determines the monthly pension payment amount based on the number of pension accounts calculated by the number-of-accounts calculating unit.

If the number (a) of pension accounts is determined by the number-of-accounts calculating unit, the customer receives aX KRW as the amount obtained by multiplying the number (a) of pension accounts by the pension index X on the day of receiving the lifetime guaranteed pension, monthly in the future.

Thereafter, the payment processing unit makes the determined monthly pension payment to the account in the user's name (S215).

In one aspect of the present invention, when an insurance option is selected (S220), the insurance premium processing unit deducts a predetermined premium from the monthly pension payment determined in the step of determining the payment amount by the insurance premium processing unit and accrues it (S225), and if the customer dies earlier than the contracted end of life set at the time of signup of the insurance (S230), calculates the and pays the accrued insurance money (S235).

The insurance option is an option in case the customer dies earlier than average life expectancy. In this case, the customer who signs up for a lifetime guaranteed pension pays a certain percentage of the received monthly pension payment as an insurance premium until the contracted end of life is reached. If the customer dies earlier than the contracted end of life, the customer receives the insurance money. Preferably, the predetermined insurance premium and the contracted end of life may be set by the customer's judgment. In this case, the predetermined insurance premium may be increased or decreased according to the contracted end of life.

The amount of insurance money may be calculated by deeming the customer (the insured) as alive until the contracted end of life, and it may be set to pay the entire amount in a lump sum or to be paid to a beneficiary designated as an heir in the form of a lifetime guaranteed pension.

In another aspect of the present invention, when the deposit option is selected (S240), the number-of-accounts calculating unit calculates the number (a') of deposit accounts by Formula 2 below (S243).

Number($a'$) of deposit accounts=(1−profit margin on sales)×deposit amount pension index÷index When the customer makes a deposit, the number (a') of deposit accounts is determined by making a deduction from the deposit by a profit rate preset in the smart pension management system 10 and dividing it by the pension index X of the day. The payment amount determining unit determines the withdrawal amount based on the number (a') of deposit accounts calculated by the number-of-accounts calculating unit (S246).

Thereafter, when the customer wants to withdraw, an amount (a'X) obtained by multiplying the determined number (a') of deposit accounts by the pension index of the day of withdrawal is paid.

In another aspect of the present invention, when the fixed-type pension option is selected (S250), the number-of-accounts calculating unit calculates the number (a") of fixed payment accounts by Formula 3 below (S253).

Number($a''$) of fixed payment accounts=(1−profit margin on sales)×deposit amount÷pension index÷amortization period(number of months)

The payment amount determining unit determines the fixed monthly payment based on the calculated number of fixed payment accounts (3256).

Unlike the life-type pension, the fixed pension option pays a certain amount in installments for the period desired by the customer. In this case as well, the monthly payment to the customer increases as the pension index increases. The installment payment period may be arbitrarily set and changed by the customer.

According to an additional aspect of the present invention, when the pension index installment savings option is selected (S260), the number-of-accounts calculating unit 100 may calculate the number (a''') of installment savings accounts by Formula 4 (S263).

Number($a'''$) of installment savings accounts=(1−profit margin on sales)×monthly payment÷pension index The accrued amount determining unit may determine the accrued amount by multiplying the number (a''') of installment savings accounts calculated in Formula 4 by the pension index X (3269).

The pension index installment savings option is a financial service that allows a customer to deposit small amounts into a pension index investment deposit account and withdraw a large sum of money later. In this case, the payment period may be set and changed by the customer arbitrarily. The number of accounts obtained each month is calculated in the same manner as in the case of the pension index investment deposit. However, monthly deposits are applied instead of a one-time deposit.

The above-described method may be implemented as an application or in the form of program instructions executable through various computer components, which may then be recorded in a computer-readable recording medium. The computer-readable medium may include programming commands, data files, or data structures, alone or in combinations thereof.

The programming commands recorded in the computer-readable medium may be specially designed and configured for the present invention or may be known and available to one of ordinary skill in the computer software industry.

Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMs, or flash memories, or other hardware devices specially configured to retain and execute programming commands.

Examples of the programming commands may include, but are not limited to, high-level language codes executable by a computer using, e.g., an interpreter, as well as machine language codes as created by a compiler. The above-described hardware devices may be configured to operate as one or more software modules to perform processing according to the present invention and vice versa.

While the present invention has been shown and described with reference to exemplary embodiments thereof, it will be apparent to those of ordinary skill in the art that various changes in form and detail may be made thereto without departing from the spirit and scope of the present invention as defined by the following claims.

The invention claimed is:

1. A smart pension management system operating a pension management process or providing information on the Internet or using a smart pension dedicated application,
wherein the smart pension management system includes a service platform that drives the smart pension dedicated application that provides a user interface for checking pension management and related information, the smart pension dedicated application being installed and executed on the customer terminal, or the customer terminal accesses a smart pension dedicated web site,
wherein the smart pension management system provides a guide including information that is the basis of pension calculation to the customer terminal through the smart pension dedicated application or in the form of a web page of the smart pension dedicated website,
wherein the smart pension management system comprises: a communication unit, a number-of-accounts calculating unit, a payment amount determining unit, a payment processing unit, and an insurance premium processing unit,
wherein the communication unit is an IP-assigned terminal, performs data communication with a customer terminal over a mobile communication network established as per mobile communication standards, protocols, or schemes, and communicates with an external agency server and an information provider server to gather information regarding average life expectancy required for determining the amount of pension payment,
wherein the number-of-accounts calculating unit calculates a number of pension accounts based on user age information, average life expectancy information, and a pension index and calculates the number of pension accounts by a formula "number (a) of pension accounts=(1−profit margin on sales)×deposit amount÷number of viable months÷pension index," and wherein the number of viable months is a number of months remaining to an end of an average lifespan based on the user age information, wherein the payment amount determining unit determines a monthly pension payment using the number of pension accounts calculated by the number-of-accounts calculating unit, wherein the payment processing unit pays the monthly pension payment determined by the payment amount determining unit to a user's account, wherein the insurance premium processing unit, when an insurance option is selected, deducts a predetermined insurance premium from the monthly pension payment determined by the payment amount determining unit, accrues the insurance premium, and if the user dies earlier than a contracted end of life set when signing up for an insurance, calculates and pays the accrued insurance premium, wherein when a deposit option is selected, the number-of-accounts calculating unit calculates a number of deposit accounts by a formula "number (a') of deposit accounts=(1−profit margin on sales)×deposit amount÷pension index," and the payment amount determining unit determines a withdrawal amount based on the number of deposit accounts calculated by the number-of-accounts calculating unit, wherein when a fixed-type pension option is selected, the number-of-accounts calculating unit calculates a number of fixed payment accounts by a formula "number (a'') of fixed payment accounts=(1−profit margin on sales)×deposit amount÷pension index÷amortization period (number of months)," and the payment amount determining unit determines a fixed monthly payment based on the number of fixed payment accounts calculated by the number-of-accounts calculating unit, and wherein the pension index is a value determined every day and consists of three types of pension indexes created according to a bond investment-oriented type, a stock investment-oriented type, and a bond and stock mixed type asset management.

2. A method for driving a smart pension management system operating a pension management process or providing information on the Internet or using a smart pension dedicated application, wherein the smart pension management system includes a service platform that drives the smart pension dedicated application that provides a user interface for checking pension management and related information, the smart pension dedicated application being installed and executed on the customer terminal, or the customer terminal accesses a smart pension dedicated website, wherein the smart pension management system provides a guide including information that is the basis of pension calculation to the customer terminal through the smart pension dedicated application or in the form of a web page of the smart pension dedicated website, wherein the smart pension management system comprises: a communication unit, a number-of-accounts calculating unit, a payment amount determining unit, a payment processing unit, and an insurance premium processing unit, wherein the communication unit is an IP-assigned terminal, performs data communication with a customer terminal over a mobile communication network established as per mobile communication standards, protocols, or schemes, and communicates with an external agency server and an information provider server to gather information regarding average life expectancy required for determining the amount of pension payment, wherein the method comprises:

calculating a number of pension accounts based on user age information, average life expectancy information, and a pension index, by the number-of-accounts calculating unit, wherein calculating the number of pension accounts calculates the number of pension accounts by a formula "number (a) of pension accounts=(1−profit margin on sales)×deposit amount÷number of viable months÷pension index," and wherein the number of viable months is a number of months remaining to an end of an average lifespan based on the user age information;

determining a monthly pension payment using the number of pension accounts calculated by the number-of-accounts calculating unit, by the payment amount determining unit;

paying the monthly pension payment determined by the payment amount determining unit to a user's account, by the payment processing unit;

when an insurance option is selected, deducting a predetermined insurance premium from the monthly pension payment determined by the payment amount determining unit, accruing the insurance premium, and if the user dies earlier than a contracted end of life set when signing up for an insurance, calculating and paying the accrued insurance premium, by the insurance premium processing unit;

when a deposit option is selected, calculating, by the number-of-accounts calculating unit, a number of deposit accounts by a formula "number (a') of deposit accounts=(1−profit margin on sales)×deposit amount÷pension index," wherein determining the payment amount determines a withdrawal amount based on the calculated number of deposit accounts; and when a fixed-type pension option is selected, calculating, by the number-of-accounts calculating unit, a number of fixed payment accounts by a formula "number (a'') of fixed payment accounts=(1−profit margin on sales)× deposit amount÷pension index÷amortization period (number of months)," wherein determining the payment amount determines a fixed monthly payment based on the calculated number of fixed payment accounts, and wherein the pension index is a value determined every day and consists of three types of pension indexes created according to a bond investment-oriented type, a stock investment-oriented type, and a bond and stock mixed type asset management.

* * * * *